Patented Sept. 5, 1944

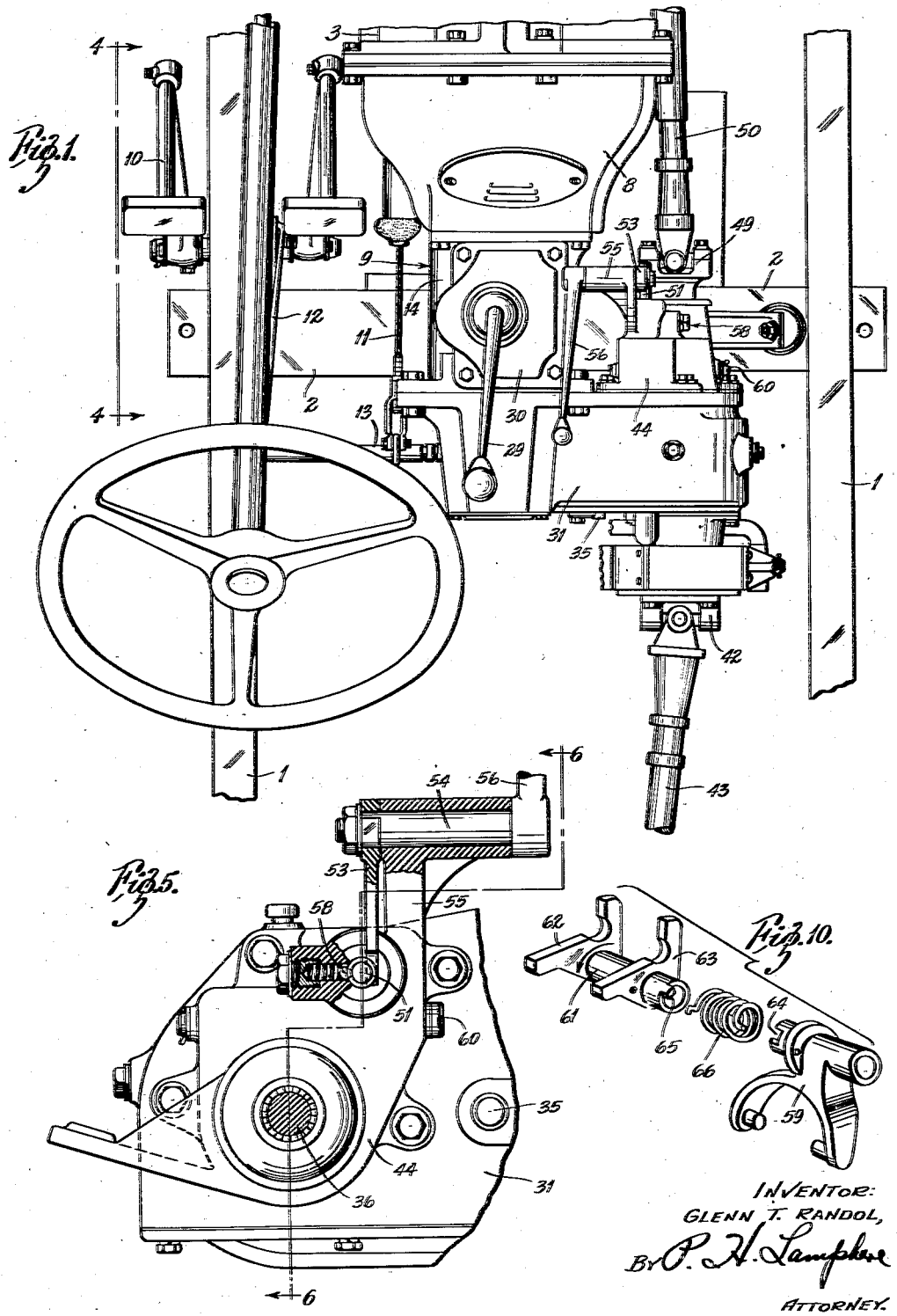

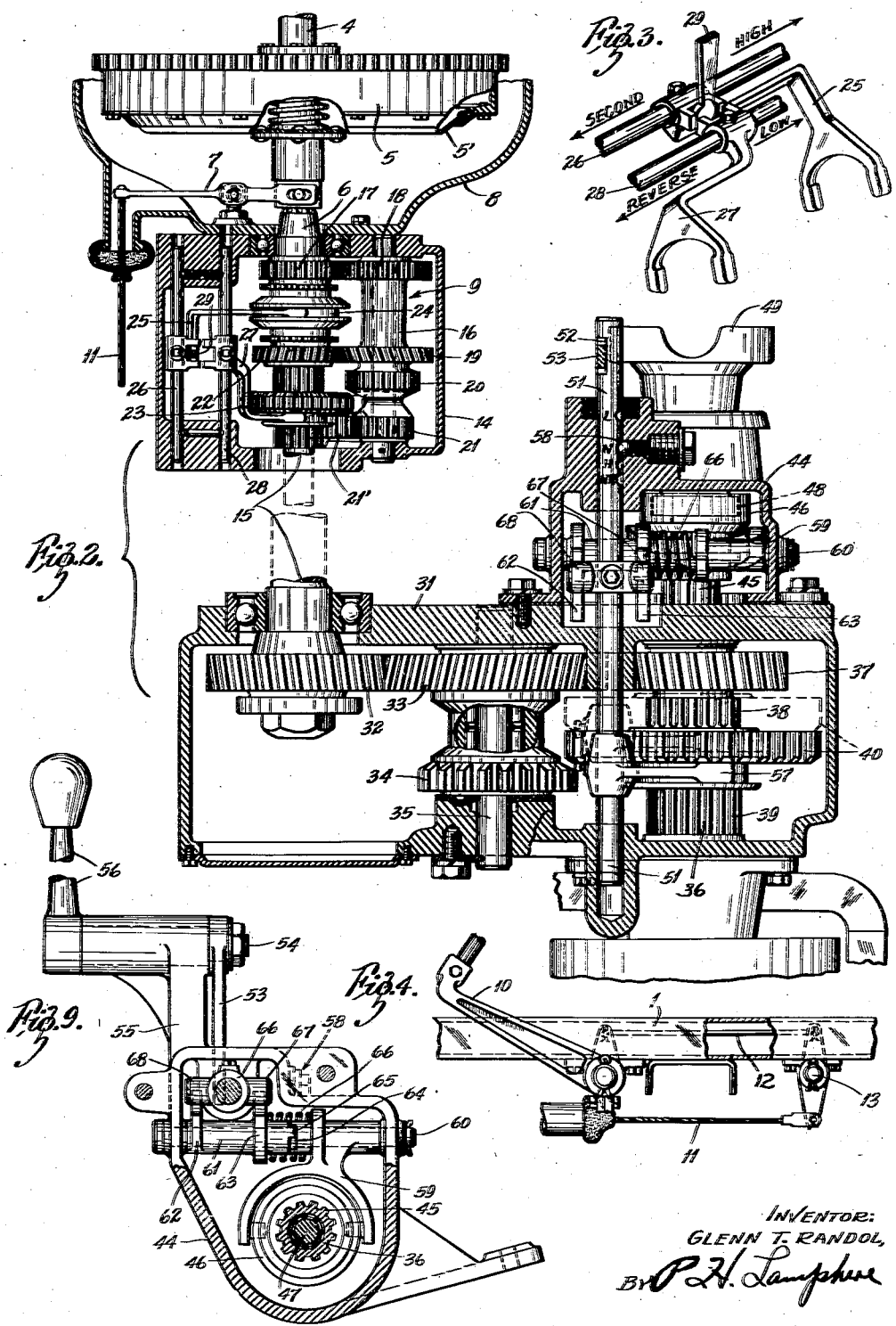

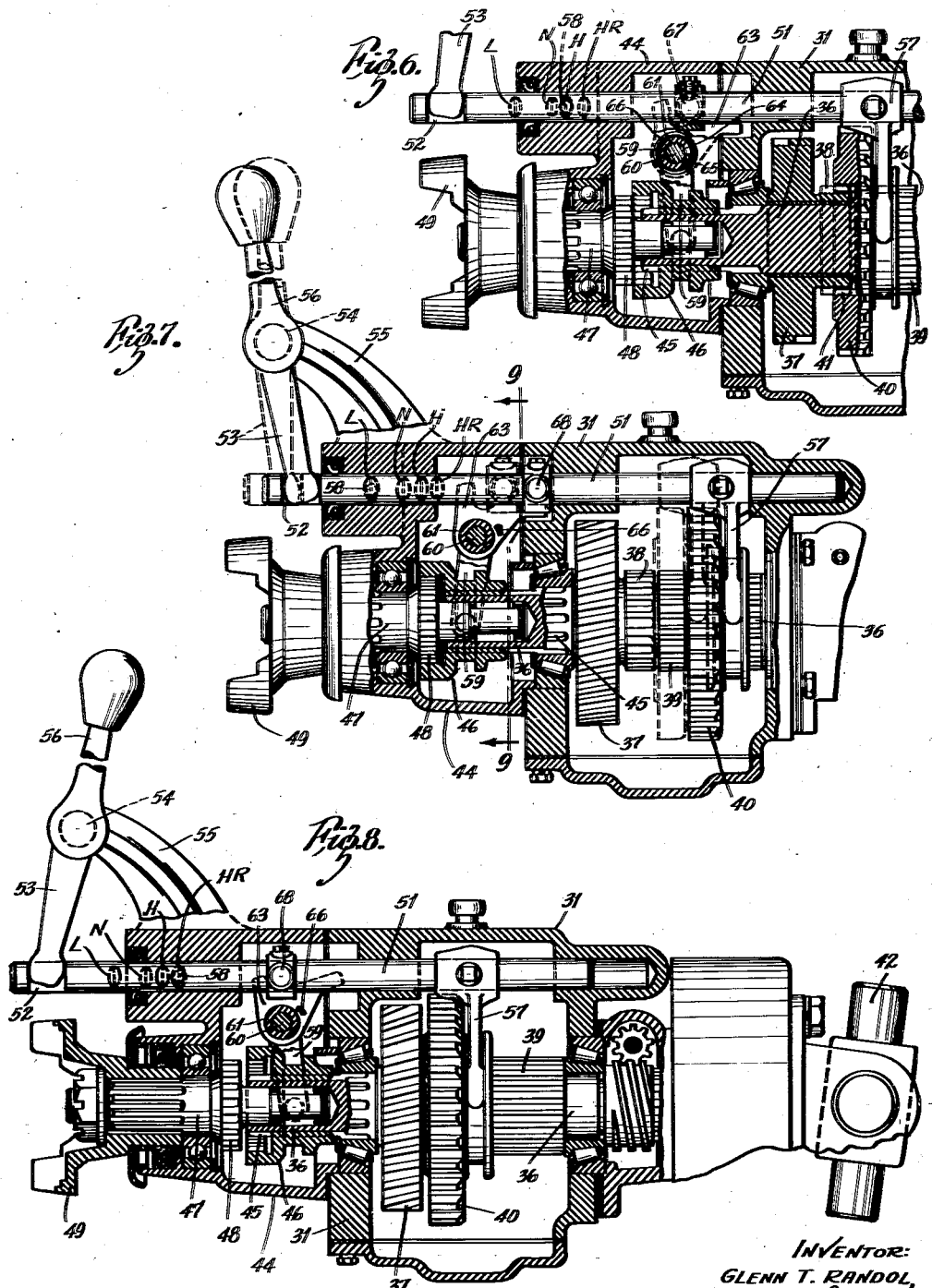

2,357,781

UNITED STATES PATENT OFFICE 2,357,781

TRANSMISSION CONTROL MECHANISM

Glenn T. Randol, St. Louis, Mo.

Application March 31, 1943, Serial No. 481,230

16 Claims. (Cl. 192—3.5)

My invention relates to change speed transmissions and more particularly to an improved control mechanism therefor.

One of the objects of my invention is to provide simplified control means for a change speed transmission system having main and auxiliary gearings for driving two driven members simultaneously or one member independently of the other.

A more specific object of my invention is to provide a single manually operable member for so controlling a two-speed auxiliary gearing employed in driving rear and front axles of a vehicle and a coupling means employed in disconnecting the front axle that the gear ratio can be changed at will and the front axle drive disconnected when one of the gear ratios is active.

Another object of my invention is to provide improved control means for permitting simple and efficient control of the driving of the rear and front axles of a vehicle at different gear ratios by the use of an auxiliary change speed gearing.

Still another object of my invention is to provide a simplified single lever control means for a two-speed ratio auxiliary transmission and a toothed coupling clutch for front axle drive purposes which will permit easy gear shifting at all times and under all driving conditions without interference from abutment of the toothed elements of the coupling clutch when caused to be operated.

Other objects of my invention will become apparent from the following description taken in connection with the accompanying drawings in which Figure 1 is a view of a portion of a motor vehicle showing main and auxiliary change speed gearings for driving both front and rear axles together with control means for the auxiliary gearing embodying my invention; Figure 2 is a horizontal sectional view showing details of the two gearing mechanisms and the control means therefor, the parts thereof being in their neutral positions and the associated coupling engaged; Figure 3 is a perspective view showing the shifting lever and forks for the main transmission; Figure 4 is a view taken on the line 4—4 of Figure 1 showing the pedal-controlled main vehicle clutch disengaging means; Figure 5 is a front end view of the auxiliary transmission and the control means therefor; Figure 6 is a vertical sectional view taken on the line 6—6 of Figure 5, showing the auxiliary gearing shifted to high gear ratio position and the front wheel drive coupling in a position to be engaged in the event the toothed elements thereof are in abutting relation; Figure 7 is a sectional view similar to Figure 6 but showing the auxiliary gearing shifted to low gear ratio position and the front wheel drive coupling engaged; Figure 8 is a sectional view similar to Figure 6 but showing the auxiliary gearing shifted to high gear ratio position and the front axle drive coupling disengaged; Figure 9 is a view, partly in section, taken on the line 9—9 of Figure 7; and Figure 10 is an exploded perspective view of the shifting fork mechanism associated with the front axle coupling.

Referring to the drawings in detail and first to Figures 1 to 4, numeral 1 indicates a frame of a motor vehicle having a cross-support 2. The engine 3, which is supported by the frame has a crankshaft 4 connected to the flywheel 5 in which is carried the main friction clutch member 5'. This clutch member is splined to the transmission drive shaft 6 of the main transmission gearing 9 and is operated through a clutch lever 7 which is pivotally supported within the clutch housing 8. The main clutch is controlled by a clutch lever 9 connected to be controlled by the usual clutch pedal 10, said connection comprising a cable 11, a link 12, and a shaft 13 having arms and being pivoted on the frame (see Figures 1 and 4). When the clutch pedal 10 is depressed, the main clutch 5' will be disengaged and when the pedal is released, the main clutch will become re-engaged to permit the crankshaft to drive the drive shaft 6 of the main change speed gearing.

The change speed gearing 9 is positioned in a casing 14 mounted on cross-support 2 and is of well-known construction comprising a splined driven shaft 15 in axial alignment with the driving shaft 6 and a counter-shaft 16 at one side of the drive and driven shafts. The counter-shaft is constantly driven from the driving shaft by gears 17 and 18 and has mounted thereon a second speed gear 19, a low speed gear 20, and a reverse gear 21. The driven shaft 15 has rotatably mounted thereon a second speed gear 22 constantly meshing with gear 19 and to the rear thereof a slidable combined low and reverse speed gear 23 capable of meshing with the low speed gear 20 on the counter-shaft or an idler gear 21' constantly driven by the reverse gear 21. Between the second speed gear 22 on the driven shaft and gear 17 on the driving shaft is a double clutch member 24 whereby the second speed gear 22 can be connected to the driven shaft to obtain second speed ratio or the driving shaft connected to the driven shaft to obtain direct or high speed drive. The clutch member 24 is controlled by a shifting fork 25 mounted on a shifting rod 26 slidable in the gear casing 14. The combined low and reverse gear 23 is also controlled by a shifting fork 27 secured to a rod 28 positioned parallel with rod 26. The two rods 26 and 28 are adapted to be controlled by the usual selecting gear shift lever 29 universally mounted in the cover plate 30 of the gear casing. It is thus seen that the main change speed gearing 9 is controllable by proper manipulation of the gear shift lever 29. Thus the driven shaft 15 of the gearing can be driven from the engine through either reverse, low, second, or high gear ratios.

Secured to the rear end of the main gear casing 14 is a transfer casing 31 into which the driven shaft 15 of the main change speed gearing projects. Mounted on the end of driven shaft 15 in this transfer casing is a gear 32 which constantly drives the gears of an auxiliary two-speed gearing contained in the transfer casing.

This auxiliary two-speed gearing has integral gears 33 and 34 mounted on a shaft 35 in the casing, gear 33 being the largest and constantly meshing with gear 32. The transfer casing also has journaled therein a shaft 36 positioned parallel with shaft 34. Rotatably mounted on shaft 36 is a gear 37 provided with clutch teeth 38 and being constantly in mesh with the previously mentioned gear 33 on shaft 34. It is thus seen that gear 37 is driven whenever power is transmitted to the driven shaft 15 of the main change speed gearing. The shaft 36 is provided with splines 39 and slidably mounted on these splines is a gear 40 provided with internal teeth 41. The gear 40 is adapted to cooperate with the previously mentioned gear 34 and the internal clutch teeth 41 are adapted to cooperate with the previously mentioned clutch teeth 38 on gear 37. Gear 40 has a central neutral position, as indicated in Figure 2, wherein the gear is not in mesh with gear 34 or the clutch teeth 41 are not in engagement with clutch teeth 38. Thus it is seen that under these neutral conditions, gears 33, 34, and 37 may be constantly driven but power is not transmitted to shaft 36. When gear 40 meshes with gear 34 power can be transmitted to shaft 36 through these gears and when gear 40 is moved so that clutch teeth 41 engage clutch teeth 38, power can be transmitted through gear 37 to shaft 36 at a higher ratio.

As best shown in Figures 1, 6, 7, and 8, the rear end of shaft 36 is connected by a universal joint 42 to a propeller shaft 43 leading to the rear axle of the vehicle for driving the rear wheels associated therewith, the driving connection including the usual differential gearing, not shown. The forward end of shaft 36 extends into a casing 44 secured to the forward end of transfer casing 31 and cross support 2, said casing being positioned along side the main gear casing 14. This forward end of shaft 36 is provided with splines 45 upon which is slidable an internally toothed clutch element 46 forming part of a coupling. Piloted into the splined end of shaft 36 is a short shaft 47 journaled in the casing 41. This shaft is provided with external clutch teeth on a clutch element 48 and said teeth are adapted to cooperate with the internal teeth of the slidable element 46, thus completing the coupling. As best shown in Figure 2, the outer end of short shaft 47 is connected by a universal joint 49 to a propeller shaft 50 leading to the front axle of the vehicle for driving the wheels associated therewith, there being suitable differential gearing between the propeller shaft and the wheels. From this construction it is seen that if the slidable element 46 of the coupling is engaged with element 48, any power being transmitted to the shaft 36 will also be transmitted to the front wheels of the vehicle. If the clutch element 46 is disengaged from teeth 48, no power will be transmitted to the front wheels.

In accordance with one feature of my invention, the slidable gear 40 and the slidable clutch element 46 are controlled by a single control lever. The control mechanism is best shown in Figures 5 to 10. The transfer casing 31 and casing 44, which encloses the coupling, has slidably mounted thereon a shifting rod 51 which extends out of the forward end of casing 44. This rod at its outer end is provided with a slot 52 in which is received the lower end of an arm 53 carried on one end of a shaft 54 journaled in an integral extension 55 of casing 44. The other end of shaft 54 has secured thereto the lower end of a lever 56 which is mounted in the driver's compartment of the vehicle along side the gear shift lever 29 for the main change speed gearing 9. Thus by means of this lever, shifting rod 51 can be reciprocated back and forth by merely grasping the upper end of lever 56 and moving it back and forth.

The shifting rod 51 in the transfer casing 31 carries a shifting fork 57 which cooperates with gear 40. The shifting rod 51 is arranged to have four positions for controlling gear 40 and in order that these positions may be easily located, casing 44 carries a spring-pressed ball detent 58 which cooperates with four recesses indicated by the letters L, N, H, and HR. The N recess is for neutral condition of the auxiliary gearing, the L and H recesses for low and high gear ratios for both rear and front axle driving, and the HR recess for high gear ratio for rear axle driving only. When the rod is so positioned that the ball of the detent engages the N recess, gear 40 will be in the previously referred to neutral position and no power will be transmitted to shaft 36. When the rod is positioned so that the ball of the detent is in the L position, gear 40 will be in mesh with gear 34 and power can be transmitted through gears 32, 33, 34, and 40 to shaft 36. When the rod is in either of the positions where the ball of the detent is in the recesses H or HR, teeth 41 on gear 40 will engage teeth 38 on gear 37 to thus connect said latter gear to shaft 36 so that power can be transmitted to said shaft from the main change speed gearing through gears 32, 33 and 37. When the ball of the detent is in the H recess, teeth 41 will engage teeth 38 only over approximately half their length whereas when the ball of the detect is in recess HR, teeth 41 will engage teeth 38 over their entire length.

The means provided for controlling the coupling by rod 51 is best shown in Figures 6 to 10, particularly Figures 9 and 10. The clutch element 46 is moved by a shifting fork 59 rotatably mounted upon a rod 60 extending across casing 44. Also rotatably mounted on this rod is a member 61 having two integral L-shaped elements 62 and 63 of like formation. The end of the shifting fork adjacent member 61 is provided with a slot 64 in which is received a lug 65 integral with member 61. The lug is smaller than the slot in order that there can be a movement of member 61 in one direction relatively to the shifting fork. Associated with the shifting fork and member 61 is a coil spring 66 which is under tension and acts as a yieldable connection between member 61 and the shifting fork whereby when member 61 is rotated in the direction indicated by the arrow in Figure 10, the shifting fork will be rotated therewith solely by the spring connection to thus shift the clutch element 46 toward teeth 48. If the teeth of clutch element 46 should be so positioned as to abut the ends of teeth 48 and not permit engagement, spring 66 will yield and permit member 61 to move relatively to the shifting fork causing additional energy to be stored in said spring. The two L-shaped elements 62 and 63 are adapted to cooperate with a member 66 carried by the rod 51. Member 66 carries oppositely extending pins 67 and 68 which are adapted to overlie the L-shaped elements 62 and 63.

When rod 51 is moved to the extreme left, as shown in Figure 8, pins 67 and 68 will so cooperate with the upstanding portions of the two L-shaped elements 62 and 63 that member 61 will rotate in the direction opposite that of the arrow and positively move the shifting fork 59 by lug 65 and cause clutch element 46 to be disengaged. The shifting of the clutch element to disengaged position is so arranged that it will occur only when rod 51 is moved from H position to HR position as shown in Figure 8. If rod 51 is moved rearwardly from the position shown in Figure 8 (from HR position toward H position), pins 67 and 68 will cooperate with the horizontal portions of the L-shaped elements 62 and 63 and cause shifting of shifting fork 59 so that the clutch element 46 is moved toward engagement with the teeth of clutch element 48. If the ends of the teeth abut each other and cannot engage, member 61, nevertheless, will be rotated relatively to the shifting fork (direction of arrow in Figure 10), thus further tensioning the connecting spring 66. This condition is shown in Figure 6 and will occur only when the teeth of the clutch element 46 and the teeth of clutch element 48 abut. As soon as there is relative rotation of the abutting teeth permitting engagement, spring 66 will be effective to cause them to engage. When rod 51 is in either of the positions where the ball of the detent is in the N recess or the L recess, pins 67 and 68 will ride along the tops of the horizontal arms of the L-shaped elements 62 and 63, this position being shown in Figure 7.

Referring now to the operation of the change speed gearing and control mechanism, when lever 56 is positioned so that the ball of the detent engages the N recess, gear 40 will be in its neutral position, as indicated in Figure 2, and the coupling will be engaged. Under these conditions the gear shift lever 29 for the main change speed gearing 9 may be either in neutral or in a gear position and the main clutch 5' engaged without any possibility of transmitting power to the wheels since shaft 36 is not connected to either gear 34 or gear 37. If it should be desired to drive the front and rear axles simultaneously through the low speed ratio of the auxiliary gearing embodied in the transfer casing, lever 56 is moved to its extreme forward position, thus placing rod 51 so that the ball of detent 58 is in the L recess. The coupling will remain engaged and gear 40 will be meshed with gear 34. When power is permitted to pass through the main change speed gearing 9 to the driven shaft 15, both the rear and front wheels of the vehicle will be driven forwardly or reversely depending upon the condition of the main change speed gearing. Shifting of the gears of the main change speed gearing will have no effect on the operating condition of the auxiliary change speed gearing. However, if it is desired to change the speed ratio of the auxiliary gearing to a higher speed ratio and continue to drive both the front and rear wheels, the main clutch 5' will be operated in the conventional manner by pedal 10 and then gear shift lever 56 moved to the position where the ball of detent 58 engages in recess H. This will cause disengagement of gear 40 from gear 34 and engagement of clutch teeth 41 with clutch teeth 38. Gear 37 will now be connected to shaft 36 and since the coupling between shaft 36 and the front wheel propeller shaft remains engaged, the power coming from the main change speed gearing will be transmitted to both the front and rear wheels.

If it should be desired to drive only the rear wheels of the vehicle through the auxiliary gearing, lever 56 is moved rearwardly to its fullest extent. This will cause rod 51 to be positioned so that the ball of the detent is in the HR slot. As rod 51 is moved to this position, pins 67 and 68 carried thereby will engage the upstanding arms of the L-shaped elements 62 and 63 and cause rocking of member 61 in the opposite direction indicated by the arrow in Figure 10. The shifting fork 59 will now be moved directly by lug 65 and clutch element 46 disengaged from clutch element 48, thus opening the coupling. When rod 51 is moved so that the ball of the detent is moved from recess H to recess HR, gear 40 will be moved with it but will not change the engaged condition of clutch teeth 41 and 38 only the extent of their engagement. Thus with the coupling open the power transmitted to the rear wheels will flow from the driven shaft of the main change speed gearing through gears 32, 33, and 37 to shaft 36.

If rod 51 should be in the HR position and it is desired to move it to any of the other positions, the coupling will again be re-engaged. If the teeth of the coupling should abut, such will not interfere with the shift. The teeth of clutch elements 46 and 48 of the coupling will automatically engage under the action of spring 66 as soon as there is such relative movement between the teeth as to eliminate the abutting condition.

The power from the engine may be transmitted through the main and auxiliary gearings to the rear wheel under all driving conditions and at any time. However, should the vehicle become stalled in mud, sand, and so forth, while driving in high gear ratio—rear axle drive—and it is desired to shift into low gear ratio—front and rear axle drives—such may be accomplished by merely disengaging the main vehicle clutch in the usual manner and then moving the auxiliary transmission shifting lever 56 to its extreme forward position. Upon re-engaging the main clutch, the vehicle should move forwardly with the drive on all four wheels. If, however, the front axle drive coupling should fail to engage due to abutment of the teeth as previously explained, the relative rotation of the coupling elements to facilitate their engagement may be accomplished by merely "rocking" the vehicle by alternate forward and reverse shifting of the main transmission gearing which will cause the teeth of the coupling members to align so that the spring 66 can "snap" the coupling member into engagement so that all four wheels may be employed to overcome the stalled condition.

Likewise if driving up a steep hill in high gear ratio—rear axle drive—and it is desired to operate the vehicle by driving through all four wheels, it is only necessary to operate the main vehicle clutch in the usual manner and move the auxiliary gear shifting lever 56 to either the H or L position depending on whether high gear or low gear ratio is desired. If the vehicle is moving, it is doubtful that spring 66 would ever be brought into use for shifting the front axle drive coupling but when the vehicle is at a standstill and it is desired to operate the vehicle through all four wheels, then the possiblity of the teeth of the coupling elements abutting is greatly increased since the two coupling elements have no relative rotation between each other to bring about correct alignment of the teeth for free engagement.

It is to be noted that the control of the auxiliary transmission and the coupling to the front wheels is a simple fore and aft movement of the lever. When the lever is in the extreme forward position, the operator will know that the auxiliary gearing is in low gear ratio and power can be transmitted to both the front and rear wheels. By moving the gear shift lever rearwardly, he can change the speed ratio of the auxiliary gearing or place the gearing in neutral. When the lever is in the extreme rear position, the operator will know that the power is being transmitted solely to the rear wheels.

My improved control mechanism is especially useful on any vehicle employing an auxiliary change speed gearing connectable at will to the front axle since it materially simplifies the control. This is very important especially on trucks employed for military purposes where the vehicle operator should be free of complicated shifting and the necessity of shifting a large number of levers to obtain desired driving ratios.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a gearing system for a vehicle having two driven members and a control means for said gearing system, a driving shaft, a driven shaft, means comprising a shiftable member for connecting the driving shaft to and disconnecting it from the driven shaft, means for connecting the driven shaft to the two driven members including a coupling for disconnecting one of the driven members from the driven shaft, a single movable element connected to the shiftable member for moving it to its connecting and disconnecting positions and other connecting means between the single movable element and the coupling for causing the coupling to be placed in a disconnected condition from a connected condition when the movable element is moved and the shiftable member is caused to connect the driving and driven shafts.

2. In a gearing system for a vehicle having two driven members and a control means for said gearing system, a driving shaft, a driven shaft, means comprising a shiftable member for connecting the driving shaft to the driven shaft for driving the latter at two-speed ratios and for disconnecting it from said driven shaft, means for connecting the driven shaft to the two driven members including a coupling for disconnecting one of the driven members from the driven shaft, a single movable element connected to the shiftable member for moving it to its connecting and disconnecting positions and other connecting means between the single movable element and the coupling for causing the coupling to be placed in a disconnected condition from a connected condition when the shiftable member is causing the driving and driven shafts to be connected through one of the gear ratios, said last named connecting means being inoperable to cause the coupling to be in a disconnected condition when the other gear ratio is active.

3. In a gearing system for a vehicle having two driven members and a control means for the gearing system, a driving shaft, a driven shaft, means comprising a shiftable member for connecting the driving shaft to and disconnecting it from said driven shaft, means for connecting the driven shaft to the two driven members including a coupling for disconnecting one of the driven members from the driven shaft, a single movable element connected to the shiftable member for moving it to its connecting and disconnecting positions and other connecting means between the single movable element and the coupling for causing the coupling to be placed in a disconnected condition when the shiftable member is in a connecting position and in a connected condition when the shiftable member is in a disconnecting position.

4. In a gearing system for a vehicle having two driven members and a control means for the gearing system, a driving shaft, a driven shaft, means comprising a shiftable member for connecting the driving shaft to and disconnecting it from said driven shaft, means for connecting the driven shaft to the two driven members, including a coupling having inter-engaging teeth for disconnecting one of the driven members from the driven shaft, a single movable element connected to the shiftable member for moving it to its connecting and disconnecting positions and other connecting means between the single movable element and the coupling for causing the coupling to be in a disconnected condition when the shiftable member is in a connecting position and to be in a connected condition when the shiftable member is in its disconnecting position, said last named means embodying yieldable means for permitting the single movable element to be moved from its position where the coupling is disconnected to a position corresponding to coupling-engaged position in the event the inter-engaging teeth of said coupling abut and prevent coupling engagement.

5. In a gearing system for a vehicle having two driven members and a control means for the gearing system, a driving shaft, a driven shaft, means comprising a shiftable member for connecting the driving shaft to the driven shaft for driving the latter at two-speed ratios and for disconnecting it from said driven shaft, means for connecting the driven shaft to the two driven members including a coupling having interengaging teeth for disconnecting one of the driven members from the driven shaft, a single movable element connected to the shiftable member for moving it to its connecting and disconnecting positions and other connecting means between the single movable element and the coupling for causing the coupling to be in a disconnected condition when the shiftable member is in one of its gear ratio positions and to be in a connected condition when the shiftable member is in its other gear ratio position or in its disconnecting position, said last named means embodying yieldable means for permitting the single movable element to be moved from its position where the coupling is disconnected to a position corresponding to coupling-engaged position in the event the inter-engaging teeth of said coupling abut and prevent coupling engagement.

6. A change speed gearing for a vehicle having two driven members, said gearing having a driven shaft and means comprising a shiftable member for driving the shaft at two different gear ratios, means for connecting the shaft to drive both members simultaneously including coupling means for disconnecting the drive from one member, and control mechanism comprising a single movable element connected to shift the shiftable member to either of its gear ratio positions, and means for disengaging the coupling by the single movable element when moved to cause one of the gear ratios to be active.

7. A change speed gearing for a vehicle having two driven members, said gearing having a driven shaft and means comprising a shiftable member for driving the shaft at two different gear ratios, means for connecting the shaft to drive both members simultaneously including coupling means for disconnecting the drive from one member, and control mechanism comprising a single movable element connected to shift the shiftable member to either of its gear ratio positions, and means for disengaging the coupling by a movement of the single movable element from a position in which a gear ratio is active to another position in which said gear ratio remains active.

8. A change speed gearing for a vehicle having two driven members, said gearing having a driven shaft and means comprising a shiftable member for driving the shaft at two different gear ratios, means for connecting the shaft to drive both members simultaneously including coupling means for disconnecting the drive from one member, and control mechanism comprising a single movable element connected to shift the shiftable member and having two positions either of which causes the shiftable member to be in a position where one gear ratio is active, and means for so connecting the movable element to the coupling that said coupling will be disengaged when the element is in one of said two positions and engaged when in the other of said two positions.

9. A change speed gearing for a vehicle having two driven members, said gearing having a driven shaft and means comprising a shiftable member for driving the shaft at two different gear ratios, means for connecting the shaft to drive both members simultaneously including coupling means for disconnecting the drive from one member, and control mechanism comprising a single movable element connected to shift the shiftable member and having four positions, two of which cause the shiftable member to be in one gear ratio, the third of which causes the shiftable member to be in the other gear ratio and the fourth of which causes the shiftable member to be in neutral, and means for so connecting the movable element to the coupling that said coupling will be disengaged when the element is in one of the first two named positions and engaged in all the other positions.

10. A change speed gearing for a vehicle having two driven members, said gearing having a driven shaft and means comprising a shiftable member for driving the shaft at two different gear ratios, means for connecting the shaft to drive both members simultaneously including coupling means having interengaging teeth for disconnecting the drive from one member, and control mechanism comprising a single movable element connected to shift the shiftable member and having four positions, two of which cause the shiftable member to be in one gear ratio, the third of which causes the shiftable member to be in the other gear ratio and the fourth of which causes the shiftable member to be in neutral, and means for so connecting the movable element to the coupling that said coupling will be disengaged when the element is in one of the first two named positions and engaged in all the other positions, said last named connecting means having yieldable means embodied therein for permitting said movable element to assume any of the positions corresponding to the engaged condition of the coupling in the event the teeth thereof abut and prevent engagement.

11. A change speed gearing for a vehicle having two driven members, said gearing having a driven shaft and means comprising a shiftable member for driving the shaft at two different gear ratios, means for connecting the shaft to drive both members simultaneously including coupling means having interengaging teeth for disconnecting the drive from one member, and control mechanism comprising a single movable element connected to shift the shiftable member and having two positions either of which causes the shiftable member to be in a position where one gear ratio is active, and means for so connecting the movable element to the coupling that said coupling will be disengaged when the element is in one of said two positions and engaged when in the other of said two positions, said last named connecting means embodying yieldable means for permitting the movable element to be placed in a position corresponding to coupling engagement notwithstanding the teeth thereof abut and prevent engagement.

12. A change speed gearing for a vehicle having two driven members, said gearing having a driven shaft and means comprising a shiftable member for driving the shaft at two different gear ratios and having two positions either of which causes one gear ratio to be active, means for connecting the shaft to drive both members simultaneously including coupling means having a slidable element for disconnecting the drive from one member, and control mechanism comprising a longitudinally movable rod, a shifting fork connected to said rod and cooperating with the shiftable member, a shifting fork connected to the slidable element of the coupling, and means for connecting the rod to the last named shifting fork so as to cause said fork to disengage the shiftable element of the coupling only when said rod is moved to a position causing the shiftable member to be in one of its two positions corresponding to one gear ratio.

13. A change speed gearing for a vehicle having two driven members, said gearing having a driven shaft and means comprising a shiftable member for driving the shaft at two different gear ratios and having two positions either of which causes one gear ratio to be active, means for connecting the shaft to drive both members simultaneously including coupling means provided with toothed elements one of which is slidable for disconnecting the drive from one member, and control mechanism comprising a longitudinally movable rod, a shifting fork connected to said rod and cooperating with the shiftable member, a shifting fork connected to the slidable element of the coupling, means for connecting the rod to the last named shifting fork so as to cause said fork to disengage the shiftable element of the coupling only when said rod is moved to a position causing the shiftable member to be in one of its two positions corresponding to one gear ratio, and yieldable means embodied in said last named connecting means permitting said rod to move to said one gear ratio position notwithstanding the teeth of the coupling abut and prevent engagement.

14. In a gearing system for a vehicle having two driven members and control means for the gearing system, a driving shaft, a driven shaft, means comprising a shiftable member for connecting the driving shaft to and disconnecting it from the driven shaft, means for connecting the driven shaft to the two driven members including a coupling having toothed elements one of which is slidable for disconnecting one of the driven members from the driven shaft, a longitudinally slidable rod, a connection between the rod and shiftable member so that said shiftable member can be moved to its connecting and disconnecting positions by a movement of the rod and other connecting means between the rod and the slidable element of the coupling for causing said slidable element of the coupling to be moved to a coupling connecting position by a predetermined movement of the rod, said last named connecting means comprising a lost motion connection and yieldable means associated therewith permitting said rod to be moved without movement of the shiftable element of the coupling in the event said shiftable element fails to engage due to the abutment of the cooperating teeth.

15. A change speed gearing for a vehicle having two driven members, said gearing having a driven shaft and means comprising a shiftable member for driving the shaft at two different gear ratios and having two positions either of which causes one gear ratio to be active, a third position causing the gearing to be in neutral and a fourth position causing the other gear ratio to be active, means for connecting the shaft to drive both members simultaneously including coupling means having a slidable element for disconnecting the drive from one member, a longitudinally movable rod, a shifting fork connected to said rod and cooperating with the shiftable member, a shifting fork connected to the slidable element of the coupling, and connecting means between the rod and the last named shifting fork, said connecting means embodying means for causing the slidable element of the coupling to be disengaged when said rod is moved to cause the shiftable member to be in one of its two positions corresponding to one gear ratio and to cause the shiftable element of the coupling to be engaged when the rod is moved to cause the shiftable element to be in its other position corresponding to said one gear ratio or to be in the positions corresponding to neutral and the other gear ratio.

16. In combination with two driven members and a source of power, a gearing system for driving said two driven members and comprising a shiftable member for connecting both driven members to a source of power and a coupling having toothed elements one of which is slidable for independently disconnecting one of the members from the source of power, control means comprising a longitudinally slidable rod, a connection between the shiftable member and the rod for moving said member with the rod, and other connecting means between the rod and the slidable element of the coupling for causing the coupling to be engaged and disengaged, said other connecting means embodying means for causing energy to be stored up for subsequently shifting the slidable element when the rod is moved but the slidable element is prevented from assuming engaged position due to tooth abutment.

GLENN T. RANDOL.